United States Patent
Holmes

Patent Number: 6,026,869
Date of Patent: Feb. 22, 2000

[54] CUTTING TOOL CONFIGURATION FOR A FELLER-BUNCHER

[75] Inventor: Robert H. Holmes, Bonifay, Fla.

[73] Assignee: Caterpillar Inc., Peoria, Ill.

[21] Appl. No.: 09/328,318

[22] Filed: Jun. 8, 1999

Related U.S. Application Data

[60] Provisional application No. 60/111,429, Dec. 8, 1998.

[51] Int. Cl.$^7$ .................................................. A01G 23/08
[52] U.S. Cl. ......................... 144/4.1; 144/34.1; 144/336
[58] Field of Search ................................ 144/4.1, 24.13, 144/34.1, 34.5, 335, 336, 338

[56] References Cited

U.S. PATENT DOCUMENTS

| | | | |
|---|---|---|---|
| 3,643,712 | 2/1972 | Doel et al. | 144/34.1 |
| 3,981,336 | 9/1976 | Levesque | 144/4.1 |
| 3,991,299 | 11/1976 | Albright | 144/34.1 |
| 4,023,604 | 5/1977 | Stadnick | 144/24.13 |
| 4,205,712 | 6/1980 | Boschen | 144/24.13 |
| 4,273,168 | 6/1981 | Propst | 144/34.1 |
| 4,592,398 | 6/1986 | Golob et al. | 144/4.1 |
| 4,653,555 | 3/1987 | Mellgren | 144/4.1 |
| 4,769,977 | 9/1988 | Milbourn | 144/34.1 |
| 4,815,506 | 3/1989 | Kainz | 144/24.13 |
| 4,919,175 | 4/1990 | Samson | 144/24.13 |
| 4,987,935 | 1/1991 | Corcoran et al. | 144/34.1 |
| 5,129,438 | 7/1992 | Hamilton | 144/343 |
| 5,170,825 | 12/1992 | Elliot | 144/34.1 |
| 5,628,354 | 5/1997 | Kingston | 144/338 |
| 5,697,412 | 12/1997 | Kurelek | 144/34.5 |
| 5,727,610 | 3/1998 | Isley | 144/4.1 |

FOREIGN PATENT DOCUMENTS

0437803A1  7/1991  European Pat. Off. ..... A01G 12/091

*Primary Examiner*—W. Donald Bray
*Attorney, Agent, or Firm*—Maginot, Addison & Moore

[57] ABSTRACT

An apparatus for felling and bunching trees is disclosed. The apparatus includes a frame and a yoke pivotably connected to the frame. The apparatus further includes a tool support pivotably connected to the yoke at a pivot axis and a cutting tool supported by the tool support. The cutting tool has a leading edge LE which is advanced toward the trees during a felling operation. The cutting tool further has a trailing edge TE which lags behind the leading edge LE when the leading edge LE is advanced toward the trees during the felling operation. The apparatus yet further includes a tilt cylinder positioned between the frame and the tool support. The tilt cylinder is movable between an extended tilt position and a retracted tilt position. The leading edge LE is moved closer to the ground when the tilt cylinder is moved from the retracted tilt position to the extended tilt position. The leading edge LE is moved away from the ground when the tilt cylinder is moved from the extended tilt position to the retracted tilt position. A first distance D1 is defined between the leading edge LE and the trailing edge TE. The pivot axis defines a vertical plane that intersects the cutting tool at a line V1. A second distance D2 is defined between the line V1 and the leading edge LE. And the ratio of the second distance to the firs distance is less than or equal to 0.50.

16 Claims, 4 Drawing Sheets

CUTTING TOOL CONFIGURATION FOR A FELLER-BUNCHER

This application claims the benefit of U.S. Provisional Application Ser. No. 60/111,429, filed Dec. 8, 1998.

TECHNICAL FIELD OF THE INVENTION

The present invention relates generally to a feller-buncher, and more specifically a cutting tool configuration for a feller-buncher.

BACKGROUND OF THE INVENTION

Feller-bunchers are used to fell, or cut down, a number of trees and then to bunch the trees together for transport. The bunched trees are then transported to a storage site for further processing. Typical feller-bunchers are articulated machines that include a front frame and a rear frame that are pivotally coupled by a hitch. The hitch allows the front frame to pivot relative to the rear frame so as to steer the fell-buncher. The front frame includes a front axle having a pair of wheels mounted thereon, and the rear frame includes a rear axle also having a pair of wheels mounted thereon.

The feller-buncher further includes a work tool that cuts down trees and secures the cut trees to the feller-buncher. The work tool is mounted on a yoke that is pivotally attached to the front frame of the fell-buncher. The yoke can be raised or lowered relative to front frame in order to position the work tool during operation. The work tool includes a rotating saw which is used to cut down trees. In addition, the work tool has a number of hydraulically powered work arms which are used to secure the trees within the work tool after the trees have been cut down.

The feller-buncher further includes a tilt cylinder which is operable to pivot the work tool relative to the yoke. To unload the trees from the work tool, the work tool is tilted forward relative to the yoke and the work arms release the trees from the work tool. A disadvantage of feller-bunchers that have heretofore been designed is that as the work tool is tilted forward, a leading edge of the rotating saw is moved significantly closer to the ground. If the rotating saw contacts a hard object, such as a rock, the rotating saw can become damaged. Such damage may require expensive and time consuming repairs to the rotating saw. To compensate for moving the rotating saw closer to the ground, the operator must raise the work tool to provide additional clearance between the rotating saw and the ground as the work tool is tilted forward. However, raising the work tool has two disadvantages. First, raising the work tool raises the center of gravity of the entire feller-buncher thereby decreasing the stability of the feller-buncher. Second, raising the work tool adds an extra step to the unloading process, which can potentially slow down the unloading process and lead to reduced productivity from the feller-buncher.

What is needed therefore is an apparatus and method for felling and bunching trees which overcome one or more of the above-mentioned drawbacks.

DISCLOSURE OF THE INVENTION

In accordance with a first embodiment of the present invention, there is provided an apparatus for felling and bunching trees. The apparatus includes a frame and a yoke pivotally connected to the frame. The apparatus further includes a tool support pivotably connected to the yoke at a pivot axis and a cutting tool supported by the tool support. The cutting tool has a leading edge LE which is advanced toward the trees during a felling operation. The cutting tool further has a trailing edge TE which lags behind the leading edge LE when the leading edge LE is advanced toward the trees during the felling operation. The apparatus yet further includes a tilt cylinder positioned between the frame and the tool support. The tilt cylinder is movable between an extended tilt position and a retracted tilt position. The leading edge LE is moved closer to the ground when the tilt cylinder is moved from the retracted tilt position to the extended tilt position. The leading edge LE is moved away from the ground when the tilt cylinder is moved from the extended tilt position to the retracted tilt position. A first distance D1 is defined between the leading edge LE and the trailing edge TE. The pivot axis defines a vertical plane that intersects the cutting tool at a line V1. A second distance D2 is defined between the line V1 and the leading edge LE. And the ratio of the second distance to the firs distance is less than or equal to 0.50.

In accordance with a second embodiment of the present invention, there is provided an apparatus for felling and bunching trees. The apparatus includes a yoke pivotably connected to the frame and a tool support pivotably connected to the yoke at a pivot axis. The apparatus further includes a cutting tool supported by the tool support. The cutting tool has a leading edge LE which is advanced toward the trees during a felling operation and a trailing edge TE which lags behind the leading edge LE when the leading edge LE is advanced toward the trees during the felling operation. The apparatus still further includes a tilt cylinder movable between an extended tilt position and a retracted tilt position. The cutting tool is caused to tilt when the tilt cylinder is moved between the extended tilt position and the retracted tilt position. A first distance D1 is defined between the leading edge LE and the trailing edge TE. The pivot axis defines a vertical plane that intersects the cutting tool at a line V1. A second distance D2 is defined between the line V1 and the leading edge LE. The ratio of the second distance to the first distance is less than or equal to 0.50.

BEST MODE FOR CARRYING OUT THE INVENTION

Figure 1:
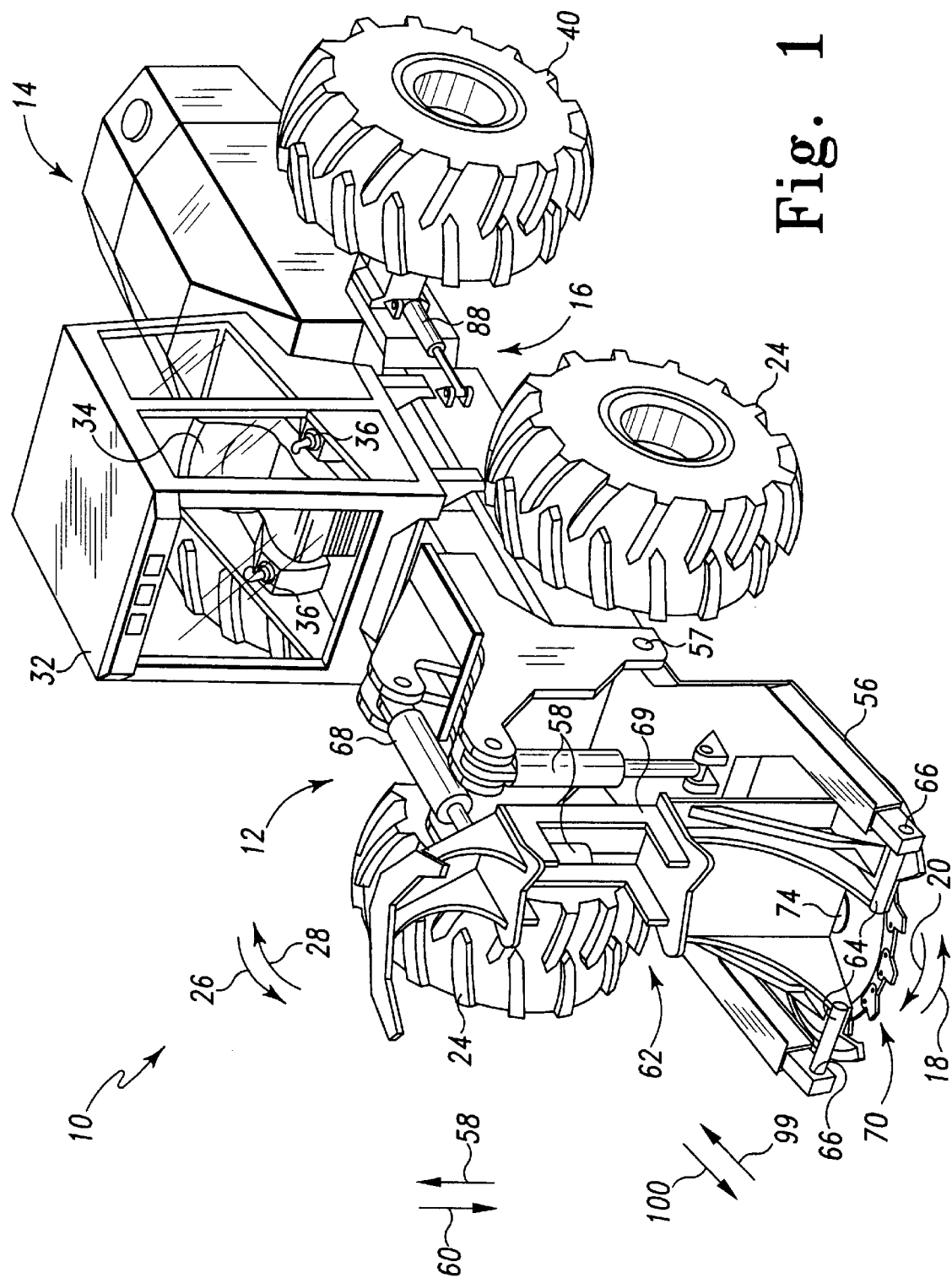
FIG. 1 is a perspective view of a fell-buncher which incorporates the features of the present invention therein.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Figure 2:
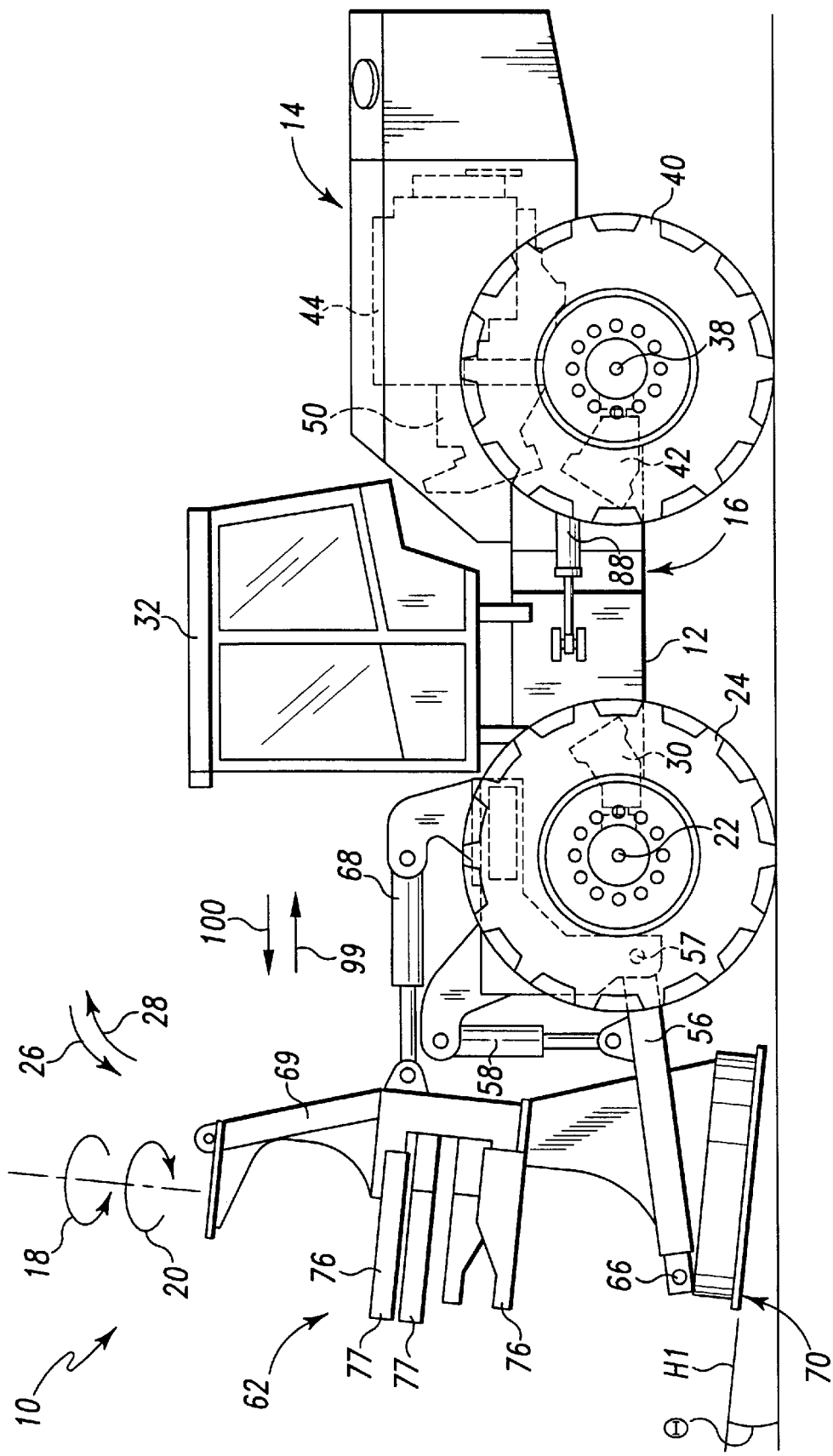
FIG. 2 is a side elevational view of the feller-buncher of FIG. 1.

Referring now to FIGS. 1 and 2, there is shown a feller-buncher 10 that incorporates the features of the present invention therein. The feller-buncher 10 includes front frame 12 and a rear frame 14. The front frame 12 is pivotally connected to the rear frame 14 via a hitch 16. In particular, the hitch 16 allows the front frame 12 to pivot relative to the rear frame 14 in the general direction of arrows 18 and 20 of FIG. 1.

The front frame 12 is supported by a front axle 22. Two wheels 24 are mounted to the front axle 22. In particular, the front axle 22 and the wheels 24 can rotate relative to the front frame 12 in the general direction of arrows 26 and 28. A front hydraulic motor 30, shown in FIG. 2, is supported by the front frame 12 and operatively coupled to the front axle 22. The front hydraulic motor 30 is a bidirectional motor which allows the front hydraulic motor 30 to drive the front axle in the general direction of arrow 26 or 28. Driving the front axle 22 in the general direction of arrow 26 advances the front frame 12 in the general direction of arrow 100 whereas driving the front axle 22 in the general direction of arrow 28 advances the front frame 12 in the general direction of arrow 99. The front frame 12 further supports a cab 32 which includes a seat 34 (shown in FIG. 1) for an operator of the feller-buncher 10. The cab 32 further includes a number of controls 36 (shown in FIG. 1) which are manipulated by the operator to control various operations of the feller-buncher 10.

The rear frame 14 is similarly supported by a rear axle 38. Two wheels 40 are mounted to the rear axle 38. In particular, the rear axle 38 and the wheels 40 can rotate relative to the rear frame 14 in the general direction of arrows 26 and 28. A rear hydraulic motor 42 is supported by the rear frame 14 and operatively coupled to the rear axle 38. The rear hydraulic motor 42 is a bi-directional motor which allows the rear hydraulic motor 42 to drive the rear axle 38 in the general direction of arrow 26 or 28. Driving the rear axle 38 in the general direction of arrow 26 advances the rear frame 14 in the general direction of arrow 100 whereas driving the rear axle 38 in the general direction of arrow 28 advances the rear frame 14 in the general direction of arrow 99.

The feller-buncher 10 further includes an engine 44. The engine 44 is mounted on the rear frame 14. The engine 44 generates mechanical energy which is transferred to a pump assembly 50. The pump assembly 50 includes a number of pumps which convert the mechanical energy of the engine 44 to hydraulic energy which is used to power various hydraulic components of the fell-buncher 10, such as the front hydraulic motor 30 and the rear hydraulic motor 42. In particular, the pump assembly 50 includes a pump housing 51, a first hydraulic pump 52, and a second hydraulic pump 54. Both the first hydraulic pump 52 and the second hydraulic pump 54 are contained within the pump housing 51. Each of the first hydraulic pump 52 and the second hydraulic pump 54 is a variable displacement pump that can provide a variable volume of pressurized fluid to the hydraulically powered components of the feller-buncher 10.

The feller-buncher 10 further includes a yoke 56 pivotally attached to the front frame 12. In particular, the yoke 56 rotates relative to the front frame 12 in the general direction of arrows 26 and 28 about a pin 57. A pair of lift cylinders 58 are interposed between the front frame 12 and the yoke 56. As the lift cylinders 58 are extended, the lift cylinders 58 cause the yoke 56 to move in the general direction of arrow 58 which causes the yoke to pivot about the front frame 12 in the general direction of arrow 26. On the other hand, as the lift cylinders 58 are retracted, the lift cylinders 58 cause the yoke 56 to move in the general direction of arrow 60 which causes the yoke 56 to pivot about the front frame 12 in the general direction of arrow 28.

A work tool 62 is pivotally mounted to the yoke 56. To this end, the work tool 62 includes a pair of pins 64 which are recieved in one of a respective pin aperture 66 defined in the yoke 56. The pins 64 allow the work tool 62 to pivot about the yoke in the general direction of arrows 26 and 28. A tilt cylinder 68 is interposed between the front frame 12 and an upper portion of the work tool 62. As the tilt cylinder 68 is extended, the tilt cylinder 68 urges the upper portion of the work tool in the general direction of arrow 100 which causes the work tool 62 to rotate in the general direction of arrow 26 about the pin apertures 66 of the yoke 56. Conversely, as the tilt cylinder 68 is retracted, the tilt cylinder 68 urges the upper portion of the work tool in the general direction of arrow 99 which causes the work tool 62 to rotate in the general direction of arrow 28 about the pin apertures 66 of the yoke 56.

Figure 3:
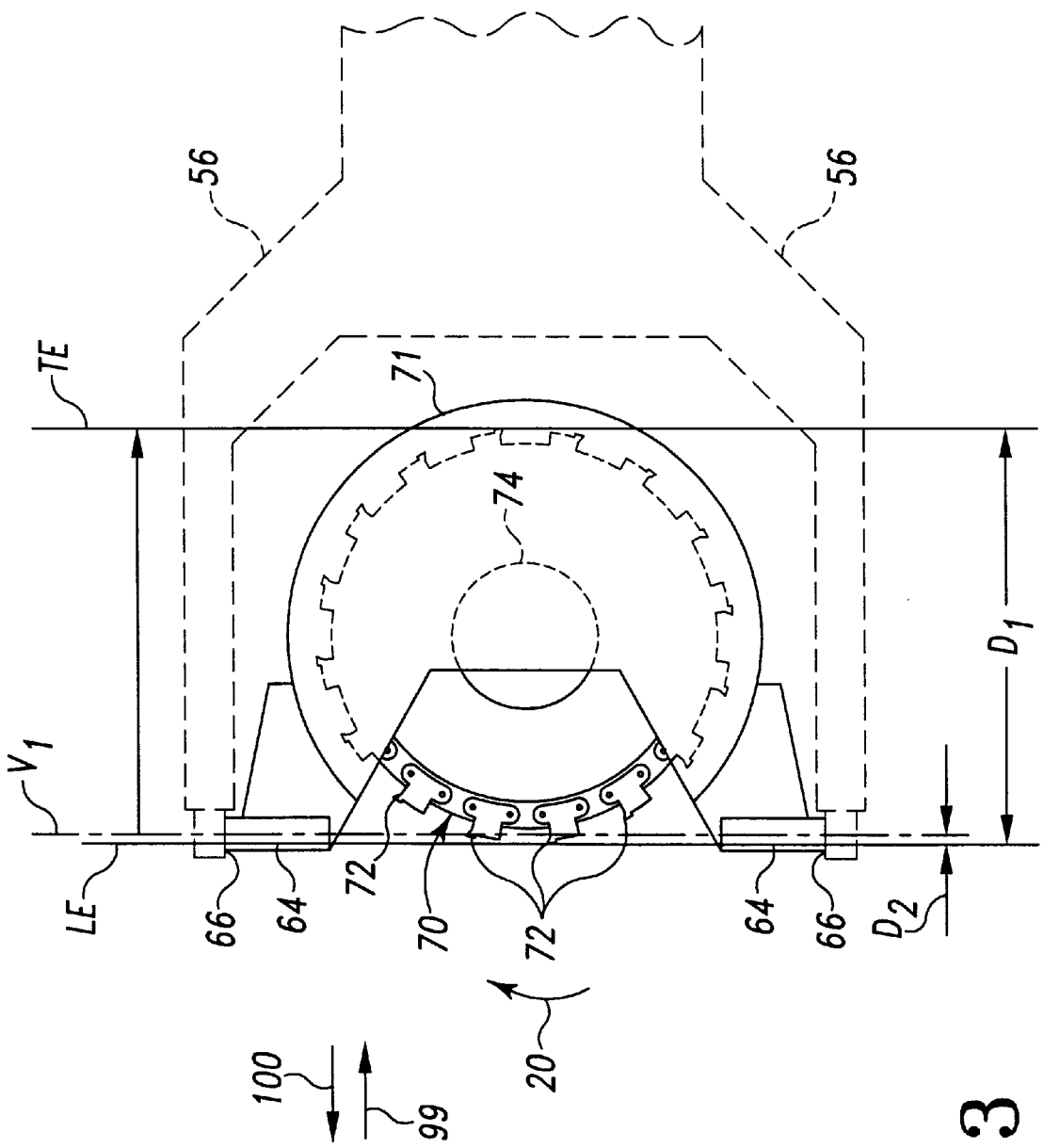
FIG. 3 is an enlarged top elevational view of cutting tool of the feller-buncher of FIG. 1.

Referring now to FIGS. 2 and 3, the work tool 62 includes a support member 69 which supports various components of the work tool 62. The work tool 62 further includes a cutting tool 70 which is rotatably secured to a lower portion of the support member 69 such that the cutting tool 70 can rotate in the general direction of arrow 20. The cutting tool 70 is a rotating saw having number of blades, or cutting teeth 72, defined thereon (see FIG. 3). A saw motor 74 is secured to the support member 69 and is operative to rotate the cutting tool 70 in the general direction of arrow 20. In particular, the saw motor 74 is a hydraulic motor which is powered by one or more of the first hydraulic pump 52 and the second hydraulic pump 54. During a felling operation, the feller-buncher 10 is advanced in the general direction of arrow 100 and the cutting tool 70 is rotated in the general direction of arrow 20. As the cutting tool 70 is rotated in the general direction of arrow 20, the cutting teeth 72 cut through any trees that come into contact with the cutting tool 70. The cutting tool 70 further includes a blade guard 71 which covers the side, rear, and underneath portions of the rotating cutting tool 70 that are not advanced into a tree during a felling operation.

Referring again to FIG. 3, the cutting tool 70 defines a leading edge LE. The leading edge LE is a line that defines the furthest point of the cutting tool 70 in the general direction of arrow 100. The leading edge LE defines the most forward point at which the cutting tool 70 can begin to cut into trees as the feller-buncher 10 is advanced in the general direction of arrow 100. Similarly, the cutting tool 70 defines a trailing edge TE. The trailing edge TE is furthest point of the cutting tool 70 in the general direction of arrow 99. The trailing edge TE is a line that defines the most rearward point of the cutting tool 70. It should be appreciated that as the tilt cylinder 68 is extended, the work tool 62 rotates about the pins 64 in the general direction of arrow 26 so as to position the leading edge LE closer to the ground. On the other hand, as the tilt cylinder 68 is retracted, the work tool 62 rotates about the pins 64 in the general direction of arrow 28 so as to position the leading edge LE farther from the ground.

In addition, the pivot axis of the work tool 62 about the pin apertures 66 of yoke 56 defines a vertical plane, and the vertical plane intersects the work tool 70 to define a line V1. A first distance D1 is defined as the distance between the leading edge LE and the trailing edge TE. A second distance D2 is defined as the distance between the line V1 and the leading edge LE. The second distance D2 is less than one half of the first distance D1. Preferably, the second distance D2 is less than one fourth of the distance D1. It should be appreciated that reducing the distance D2 decreases the vertical movement of the leading edge LE of the cutting tool 70 as the work tool is rotated relative to the yoke 56 in the general direction of arrows 18 and 20.

Referring again to FIG. 2, the leading edge LE and the trailing edge TE define a line H1. The line H1 intersects with the ground to form an angle θ1. It should be appreciated that the front frame 12, yoke 56, work tool 62, and tilt cylinder 68 are advantageously configured to maintain the angle θ1 substantially the same as the lift cylinders 58 are moved between the extended and the retracted positions. Thus, because of the configuration of the tilt cylinder 68 relative to the work tool 62, the tilt cylinder prevents the rotation of the work tool 62 relative to the ground and the angle θ1 is remains substantially the same as the lift cylinders 58 are retracted.

On a similar note, because of the configuration of the tilt cylinder 68 relative to the work tool 62, the tilt cylinder 68 prevents the rotation of the work tool 62 relative to the ground and the angle θ1 is remains substantially the same as the lift cylinders 58 are extended. Thus, the angle θ1 is maintained at a substantially constant value as the lift cylinders 56 are extended and retracted.

Referring again to FIGS. 1 and 2, the work tool 62 further includes a number of work arms 76, 77 (shown in FIGS. 2 and 3) which are rotatably secured to the support member 69. An arm cylinder 78 (shown in FIG. 4) is operable to move the work arms 76, 77 between a receiving position in which trees can be advanced between the work arms 76, 77 and a securing position in which trees are secured to the support member 69. In particular, as the arm cylinder 78 is extended, the work arm 76 rotates in the general direction of arrow 20 from the receiving position, shown in FIG. 4, to the securing position, not shown. Concurrently, as the arm cylinder 78 is extended, the work arm 77 rotates in the general direction of arrow 18 from the receiving position, shown in FIG. 4, to the securing position, not shown, thereby securing any trees within the work tool 62.

Once the trees have been felled, or cut, by the cutting tool 70 and secured within the work tool 62 by the work arms 76, 77, the trees are transported to a site where the trees are stored for further processing. To remove the trees from the work tool 62, (i) the trees must be unsecured from the work tool 62 and (ii) the work tool 62 must be tilted forward in the general direction of arrow 26 so that the trees will fall to the ground in front of the feller-buncher 10. To unsecure the trees from the work tool 62, the arm cylinder 78 is retracted causing the work arm 76 to rotate in the general direction of arrow 18 from the securing position, not shown, to the receiving position, shown in FIG. 4. Concurrently, as the arm cylinder 78 is retracted, the work arm 77 rotates in the general direction of arrow 20 from the securing position, not shown, to the receiving position, shown in FIG. 4, thereby releasing the trees previously secured within the work tool 62.

To tilt the work tool 62 forward, the tilt cylinder 68 is extended thereby causing the work tool 62 to rotate relative to the yoke 56 in the general direction of arrow 26. It should be appreciated that a significant advantage of the present invention is that as the work tool 62 is tilted forward in the general direction of arrow 26, the leading edge LE (shown in FIG. 3) of the cutting tool 70 is not moved significantly closer to the ground than prior to the tilting of the work tool 62. In feller-bunchers that have heretofore been designed, as the work tool is tilted forward, the leading edge of the work tool is urged toward the ground thereby making it likely that the work tool could be damaged by contacting the ground. To avoid damaging the work tool, operators of prior art feller bunchers would raise the yoke prior to tilting the work tool, thus making the feller buncher less stable.

The present invention has the advantages of (i) reducing the probability that the cutting tool 70 of the work tool 62 will be damaged during an unloading operation, (ii) being easier for the operator to operate because the unloading operation does not require the additional action of raising the work tool 62 when the work tool 62 is tilted forward in the general direction of arrow 26, and (iii) increasing the stability of the feller-buncher 10 during unloading operations because the work tool 62 is maintained lower to the ground.

Figure 4:
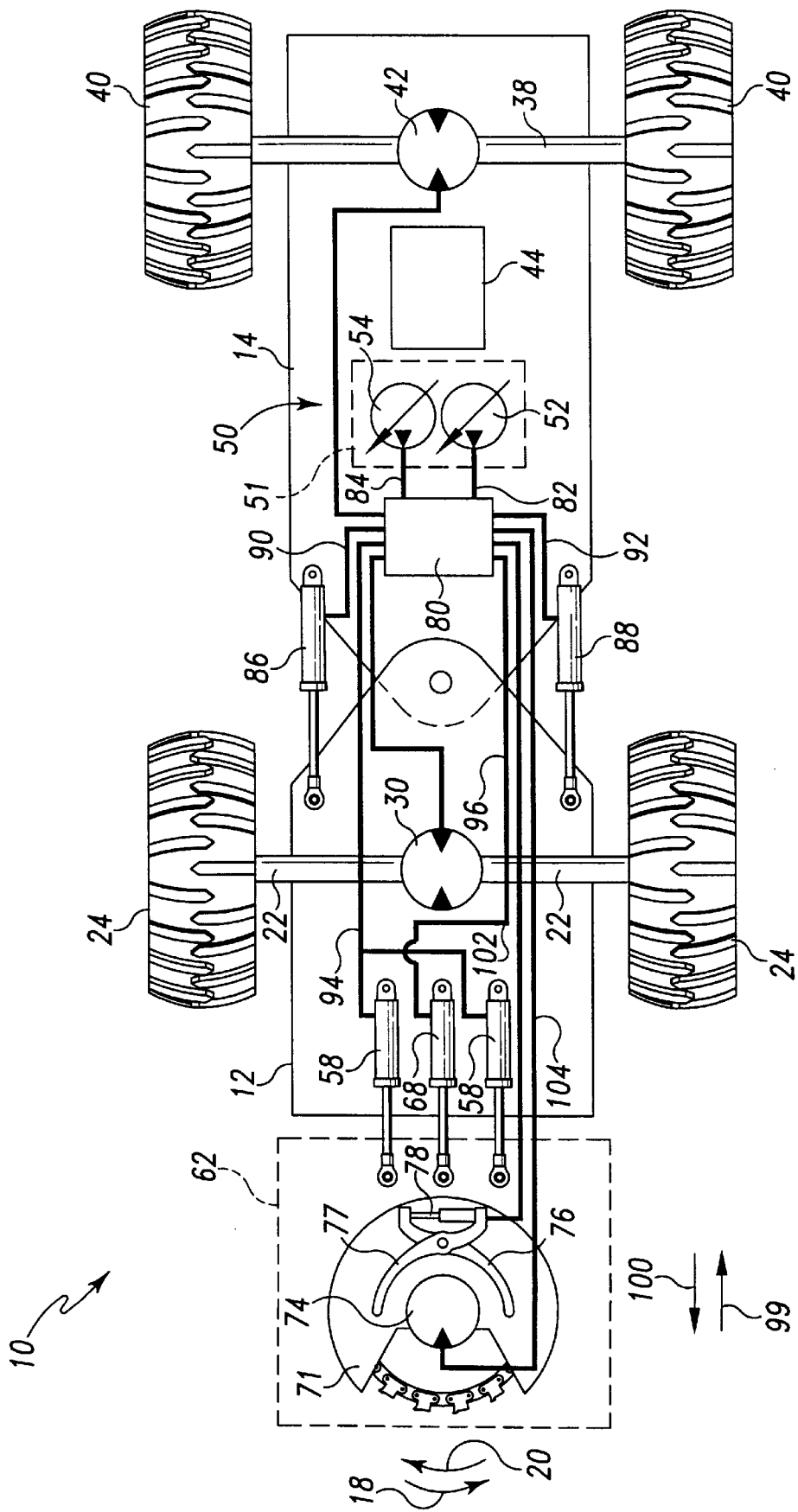
FIG. 4 is a schematic view of the hydraulic system of the feller buncher of FIG. 1.

Referring now to FIG. 4, there is shown a schematic view of the hydraulic system of the fell-buncher 10. The feller-buncher 10 further includes a valve assembly 80. Pressurized fluid from the first hydraulic pump 52 is supplied to the valve assembly 80 via the fluid line 82 and pressurized fluid from the second hydraulic pump 54 is supplied to the valve assembly 80 via the fluid line 84. From the valve assembly 80, pressurized hydraulic fluid is supplied to the various hydraulic components of the feller-buncher 10. Pressurized hydraulic fluid is used to power the front hydraulic motor 30 and the rear hydraulic motor 42 so as to propel the feller buncher 10 in the general direction of arrows 99 and 100.

In addition, pressurized hydraulic fluid is used to steer the feller-buncher 10. To this end, the feller-buncher 10 further includes a right steering cylinder 86 and a left steering cylinder 88 which are operable to rotate the front frame 12 relative to the rear frame 14 about the hitch 16 in the general direction of arrows 18 and 20. Pressurized hydraulic fluid is advanced from the valve assembly 80 to the right steering cylinder 86 via the fluid line 90 whereas pressurized hydraulic fluid is advanced from the valve assembly 80 to the left steering cylinder 88 via the fluid line 92. To steer to the feller-buncher 10 to the right, the right steering cylinder 86 is retracted and the left steering cylinder 88 is extended. To steer to the feller-buncher 10 to the left, the right steering cylinder 86 is extended and the left steering cylinder 88 is retracted.

Pressurized hydraulic fluid from the valve assembly 80 is also used to power other components of the feller-buncher 10. In particular, pressurized fluid in the fluid line 94 is used to power the lift cylinders 58, pressurized fluid in the line 96 is used to power the tilt cylinder 98, pressurized fluid in the fluid line 102 is used to power the saw motor 74, and pressurized fluid in the line 104 is used to power the arm cylinder 78. In addition, hydraulic pressure from the first hydraulic pump 52 and second hydraulic pump 54 may be used to power other hydraulic devices such as brakes (not shown) and locking differentials (not shown) on the front axle 22 and the rear axle 38.

It should be appreciated that a significant advantage of the present invention is that a single hydraulic system is used to power both the drive and non-drive components of the feller-buncher 10. In fell-bunchers that have heretofore been designed, the front axles and rear axles are typically driven by a mechanical drive system. This mechanical drive systems include a drop box which splits mechanical power between the front and rear axles and a drive shaft and universal joint which transfers mechanical power across the hitch. Each of these mechanical components are high maintenance items which are expensive to operate. By using the hydraulic drive motors 30, 42, the drop box, drive shaft, and universal joint can be eliminated.

In addition, prior art work machines, such as feller-bunchers, which use hydraulics to drive the wheels, typically have a separate hydraulic system for the drive components and the non-drive components such as lift cylinders and tilt cylinders. Having two separate hydraulic systems increases the complexity of the work machine. In addition, the separating the hydraulic systems prevents any transfer of hydraulic power from one system to the other.

Industrial Applicability

In operation, the feller-buncher 10 is maneuvered toward a group of trees. In particular, pressurized hydraulic fluid from the first hydraulic pump 52 and the second hydraulic pump 54 is supplied to the front hydraulic motor 30 and the rear hydraulic motor 42 to propel the feller-buncher 10 in the general direction of arrows 99 or 100. Furthermore, pressurized hydraulic fluid is advanced to the right steering cylinder 86 and the left steering cylinder 88 to steer the feller-buncher 10 toward the trees in the general direction of arrows 18 and 20.

As the feller buncher approaches the trees, pressurized hydraulic fluid is advanced to the saw motor 74 which causes the cutting tool 70 to rotate in the general direction of arrow 20. As the feller-buncher 10 advances toward the trees, the cutting teeth 72 of the cutting tool 70 cut through the trunks of trees. Concurrently, the work arms 76, 77 are moved from a receiving position to a securing position so as to secure the trees within the work tool 62.

Subsequently, the feller-buncher 10 moves to a site where the trees are to be unloaded from the fell-buncher 10 for further processing. Once again, pressurized hydraulic fluid from the first hydraulic pump 52 and the second hydraulic pump 54 is supplied to the front hydraulic motor 30 and the rear hydraulic motor 42 to propel the feller-buncher 10 in the general direction of arrows 99 or 100. To steer the feller-buncher 10, pressurized hydraulic fluid is advanced to the right steering cylinder 86 and the left steering cylinder 88 to steer the feller-buncher 10 in the general direction of arrows 18 and 20.

To unload the trees from within the work tool 62, the trees must first be unsecured from the work tool 62. To unsecure the trees from the work tool 62, the arm cylinder 78 is retracted causing the work arms 76, 77 to move from the securing position to the receiving position thereby releasing the trees from the work tool 62. To move the trees from the work tool 62 to the site, the work tool 62 must be tilted forward in the general direction of arrow 26 so that the trees will fall to the ground in front of the feller-buncher 10. To tilt the work tool 62, the tilt cylinder 68 must be extended so as to cause the work tool 62 to rotate in the general direction of arrow 26.

It should be appreciated that as the work tool 62 rotates relative to the yoke 56, the leading edge LE of the cutting tool 70 does not move substantially closer to the ground, thus reducing the likelihood that the cutting tool 70 would come into contact with an object, such as a rock, as the feller-buncher 10 is unloaded.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

I claim:

1. An apparatus for felling and bunching trees, comprising:

a frame;

a yoke pivotably connected to said frame;

a tool support pivotably connected to said yoke at a pivot axis;

a cutting tool supported by said tool support, said cutting tool having (i) a leading edge LE which is advanced toward said trees during a felling operation, (ii) a trailing edge TE which lags behind said leading edge LE when said leading edge LE is advanced toward said trees during said felling operation; and a tilt cylinder positioned between said frame and said tool support, said tilt cylinder being movable between (i) an extended tilt position and a retracted tilt position, (ii) said leading edge LE is moved closer to the ground when said tilt cylinder is moved from said retracted tilt position to said extended tilt position, and (iii) said leading edge LE is moved away from the ground when said tilt cylinder is moved from said extended tilt position to said retracted tilt position, wherein (i) a first distance D1 is defined between said leading edge LE and said trailing edge TE, (ii) said pivot axis defines a vertical plane that intersects said cutting tool at a line V1, (iii) a second distance D2 is defined between said line V1 and said leading edge LE, and (iv) $D2/D1 \leq 0.50$.

2. The apparatus of claim 1, wherein $D2/D1 \leq 0.25$.

3. The apparatus of claim 1, further comprising a lift cylinder which is movable between a lower position and an upper position, wherein:

said leading edge LE and said trailing edge TE define a line H1 which intersects the ground to form an angle $\theta 1$, and said frame, said yoke, said tilt cylinder, and said lift cylinder are positioned in relation to each other such that said angle $\theta 1$ remains substantially the same as said lift cylinder is moved between said lower position and said upper position.

4. The apparatus of claim 1, wherein said cutting tool includes a rotating saw blade.

5. The apparatus of claim 4, further comprising a number of work arms which are movable to grasp said trees, wherein:

said number of work arms are supported by said tool support.

6. The apparatus of claim 5, further comprising a number of hydraulic pumps for supplying pressurized hydraulic fluid, wherein:

said tilt cylinder, said lift cylinder, said cutting tool, and said work arms are each in fluid communication with at least one of said number of hydraulic pumps.

7. The apparatus of claim 1, wherein:

said cutting tool includes a rotating saw blade, and said pivot axis is positioned vertically above said rotating saw blade.

8. The apparatus of claim 7, wherein:

said tool support includes a blade guard, said blade guard covers said trailing edge TE of said rotating saw blade, and said blade guard is pivotably attached to said yoke.

9. An apparatus for felling and bunching trees, comprising:

a yoke pivotably connected to a frame;

a tool support pivotably connected to said yoke at a pivot axis;

a cutting tool supported by said tool support, said cutting tool having (i) a leading edge LE which is advanced toward said trees during a felling operation, (ii) a trailing edge TE which lags behind said leading edge LE when said leading edge LE is advanced toward said trees during said felling operation; and a tilt cylinder movable between an extended tilt position and a retracted tilt position, wherein said cutting tool is caused to tilt when said tilt cylinder is moved between said extended tilt position and said retracted tilt position, wherein (i) a first distance D1 is defined between said leading edge LE and said trailing edge TE, (ii) said pivot axis defines a vertical plane that intersects said cutting tool at a line V1, (iii) a second distance D2 is defined between said line V1 and said leading edge LE, and (iv) $D2/D1 \leq 0.50$.

10. The apparatus of claim 9, wherein $D2/D1 \leq 0.25$.

11. The apparatus of claim 9, further comprising a lift cylinder which is movable between a lower position and an upper position, wherein:

said leading edge LE and said trailing edge TE define a line H1 which intersects the ground to form an angle $\theta 1$, and said frame, said yoke, said tilt cylinder, and said lift cylinder are positioned in relation to each other such that said angle $\theta 1$ remains substantially the same as said lift cylinder is moved between said lower position and said upper position.

12. The apparatus of claim 9, wherein said cutting tool includes a rotating saw blade.

13. The apparatus of claim 12, further comprising a number of work arms which are movable to grasp said trees, wherein:

said number of work arms are supported by said tool support.

14. The apparatus of claim 13, further comprising a number of hydraulic pumps for supplying pressurized hydraulic fluid, wherein:

said tilt cylinder, said lift cylinder, said cutting tool, and said work arms are each in fluid communication with at least one of said number of hydraulic pumps.

15. The apparatus of claim 9, wherein:

said cutting tool includes a rotating saw blade, and said pivot axis is positioned vertically above said rotating saw blade.

16. The apparatus of claim 15, wherein:

said tool support includes a blade guard, said blade guard covers said trailing edge TE of said rotating saw blade, and said blade guard is pivotably attached to said yoke.

* * * * *